United States Patent
Anderson et al.

[11] Patent Number: 5,937,168
[45] Date of Patent: Aug. 10, 1999

[54] ROUTING INFORMATION WITHIN AN ADAPTIVE ROUTING ARCHITECTURE OF AN INFORMATION RETRIEVAL SYSTEM

[75] Inventors: Dewey Charles Anderson, Roswell; Senis Busayapongchai, Tucker; Audrey Dibrell, Alpharetta; David J. Anderson, Lawrenceville, all of Ga.

[73] Assignee: BellSouth Corporation, Atlanta, Ga.

[21] Appl. No.: 08/866,228

[22] Filed: May 30, 1997

[51] Int. Cl.⁶ .................................................. G06F 17/30
[52] U.S. Cl. .................... 395/200.68; 370/351; 370/912; 505/170
[58] Field of Search ..................... 707/3, 4; 395/377, 395/800.27, 200.68; 711/149, 100

[56] References Cited

U.S. PATENT DOCUMENTS

| | | | |
|---|---|---|---|
| 4,128,882 | 12/1978 | Dennis ..................................... | 711/117 |
| 4,130,885 | 12/1978 | Dennis ..................................... | 711/100 |
| 5,222,238 | 6/1993 | Zobre et al. ............................. | 395/728 |
| 5,465,368 | 11/1995 | Davidson et al. ................. | 395/800.27 |
| 5,634,051 | 5/1997 | Thomson .................................... | 707/5 |
| 5,657,465 | 8/1997 | Davidson et al. ...................... | 395/377 |
| 5,689,719 | 11/1997 | Miura et al. ....................... | 395/800.11 |
| 5,692,173 | 11/1997 | Chew ......................................... | 707/3 |
| 5,721,819 | 2/1998 | Galles et al. ............................. | 395/728 |
| 5,734,649 | 3/1998 | Carvey et al. ........................... | 370/355 |
| 5,737,334 | 4/1998 | Prince et al. ............................ | 370/395 |

FOREIGN PATENT DOCUMENTS

| | | |
|---|---|---|
| 0747845 | 12/1996 | European Pat. Off. . |
| WO 97/10554 | 3/1997 | WIPO . |
| WO 97/19415 | 5/1997 | WIPO . |

*Primary Examiner*—Paul R. Lintz
*Assistant Examiner*—Ella Colbert
*Attorney, Agent, or Firm*—Jones & Askew, LLP

[57] ABSTRACT

After an origination module (OM) receives information, a packet is transmitted to a routing architecture (RA) for routing to a destination module (DM) designated by the router packet. The RA interprets the router packet and adaptively routes the router packet to the DM so that the router packet is quickly processed by the DM. If the DM's queue is empty and the DM is not processing any other packets, the RA places the router packet in the queue and the DM reads its queue to process the router packet. If there is another router packet being processed by the DM, the RA adapts by placing the router packet in the queue. Once processing of the other router packet is complete, the DM processes the router packet in the queue. If there is already another router packet pending within the DM's queue, the RA adapts by creating another DM in memory to process the router packet. If the router packet is not processed by the DM within a predetermined amount of time, the RA adapts by sending an interrupt to cancel processing within the DM and ensure that the router packet is next to be processed. Elements corresponding to the router packet's data components may be rearranged to an optimized order when adaptively routing the router packet. In the optimized order, processing of the router packet is made quicker.

21 Claims, 6 Drawing Sheets

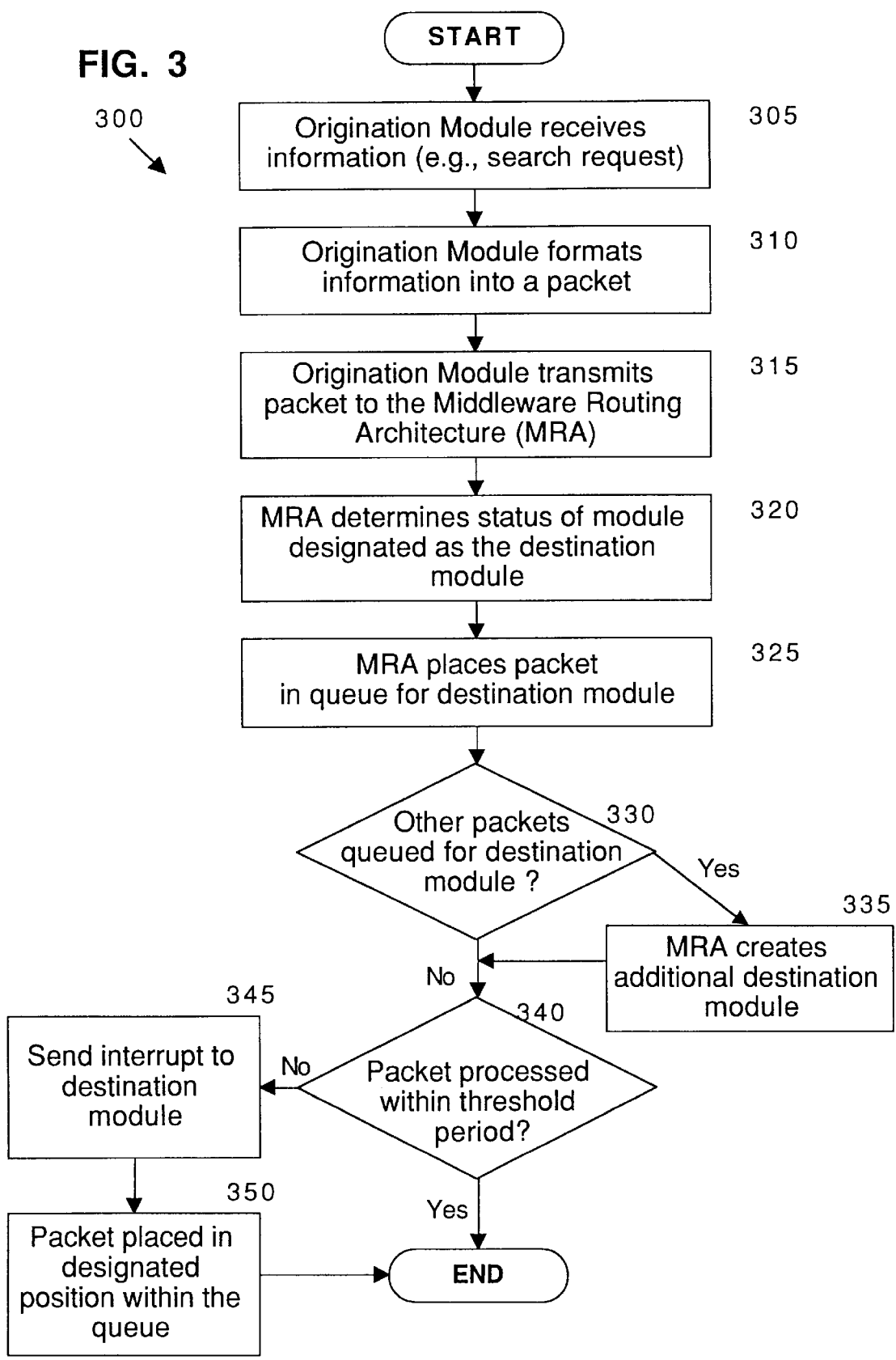

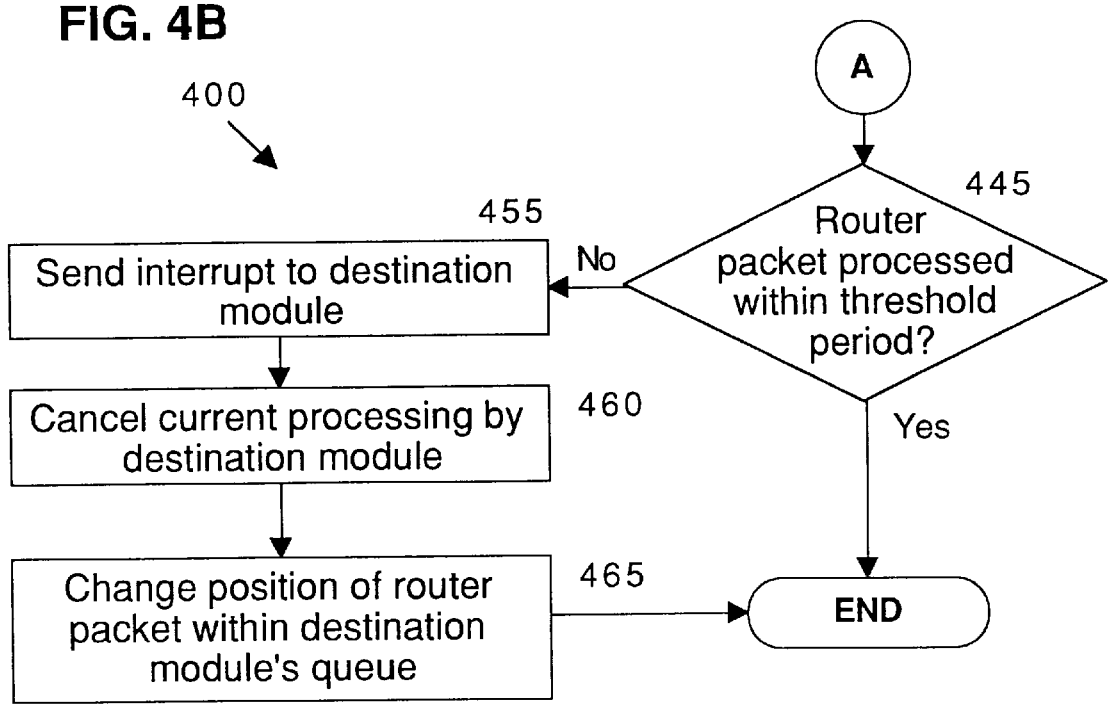

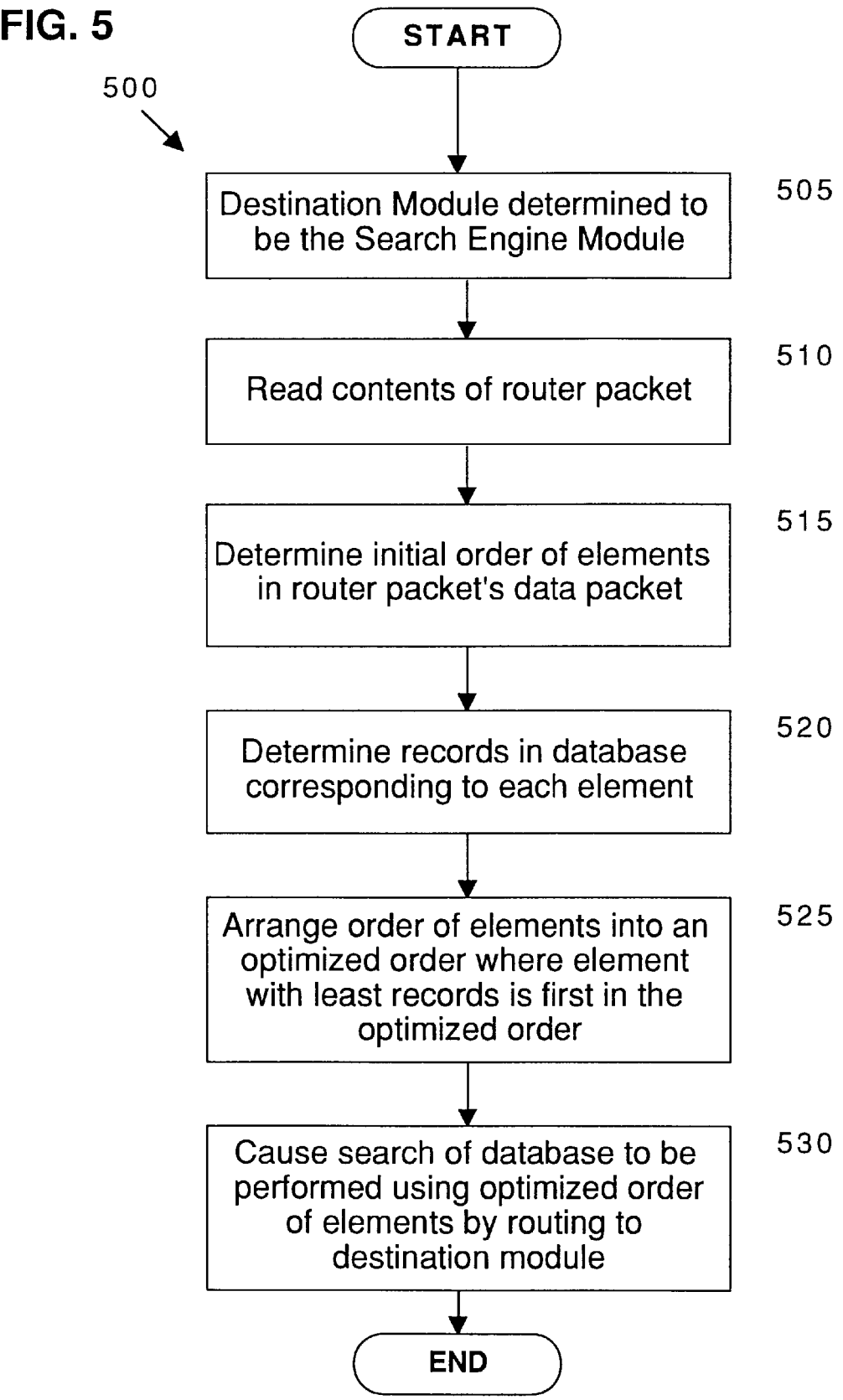

ROUTING INFORMATION WITHIN AN ADAPTIVE ROUTING ARCHITECTURE OF AN INFORMATION RETRIEVAL SYSTEM

RELATED APPLICATION

This U.S. patent application relates to pending U.S. patent application Ser. No. 08/844,751, entitled "A System and Methods for Dynamically Processing an Index to Dynamically Create a Set of Questions" and filed on Apr. 22, 1997. The present application and the related pending U.S. patent application are commonly assigned to BellSouth Corporation.

TECHNICAL FIELD

This invention generally relates to communication routing within an information retrieval system and, more particularly described, relates to dynamically routing information from an origination module to a destination module using an adaptive routing architecture within an information retrieval system.

BACKGROUND OF THE INVENTION

One might say that an explosion has rocked the world of information in the form of an ever-increasing amount of recorded and searchable information. To efficiently search for specific information within this ever-increasing amount of information, information retrieval systems have been developed.

Information retrieval systems ("IR systems") are systems for finding, organizing, and delivering information. An example of a manual IR system is a reference librarian. A searching party makes use of this manual IR system by asking the librarian to find specific information such as books or other materials. The librarian is then able to understand the request, initiate a search for the information, and send the found information to the searching party. Thus, the librarian acts as the IR system for searching, finding and delivering the found information. Although the librarian is helpful to the searching party, the librarian may not be extremely fast and may unintentionally miss information.

Computerized IR systems can be much more efficient than manual IR systems. A computerized IR system typically applies methods that involve routing messages and files between a user interface and a search engine for a database. The steps in routing requests, messages, and files between the user interface and the search engine may be accomplished by what is conventionally known as a routing architecture of "middleware" code. Typically, such middleware code is relatively straightforward to implement when dealing with a limited number of resources (the user interface and the search engine) within the IR system.

However, as the IR system becomes more heavily used, response time within the IR system may begin to diminish. The availability of the IR system's resources (such as the search engine) may be limited because of fixed or limited access limitations associated with a specific resource. For example, a search engine may only be able to process a fixed number of requests within a specific period of time. The processing of additional requests for the search engine may have to be delayed for an undesirable amount of time while previous requests are processed.

An IR system may be enhanced by providing a variety of input mechanisms (front ends) and output mechanisms (delivery modules). Adding different types of front end modules expands access to an IR system's resources, such as a search engine. For example, the IR system may include multiple types of front end modules for interacting with users via voice or digital data. This allows a user to interact with the IR system via audio input. In addition, a user may interact with the IR system by making a connection between the user's computer and the IR system's computer. Thus, the IR system may be enhanced with the ability to support different formats for information requests.

An IR system may also be enhanced by having multiple delivery modules. A delivery module is a mechanism for delivering search results in a particular format, such as digital data, audio, or facsimile. For example, a facsimile module may provide the results of a search query to a user via a facsimile. A text-to-speech module may provide the results of a search query to a user by processing the results into an audio format which is then played to the user.

Integrating new modules, such as delivery modules and additional front end modules into an IR system can be problematic. One problem faced when integrating such new modules is the lack of a common language. In a typical IR system, routing of messages and files is performed using a customized language between existing modules without the IR system. Adding a new module to the IR system may mean that all of the other modules existing within the IR system may have to be modified to support the new module. In addition, the new module must be able to communicate with each of the existing modules in its own particular manner, format, and syntax. Modifying the new module and each of the other modules within the IR system is then expensive and time consuming. Thus, a typical IR system is generally not very flexible in taking on additional enhancements.

Another problem faced when integrating new modules is that the use profiles for the resources of the IR system may increase and undesirably increase the amount of time it takes to process information by the resources. A use profile is defined as how a given resource within the IR system is used over time. A use profile associated with a given resource has periods of low to nominal usage and peak-time periods of high demand usage. When an IR system is enhanced with multiple front end modules, there is a greater opportunity to have increased demand for use of a given resource. In other words, peak-time usage of the given resource may be greater when compared to an IR system with fewer front end modules. This may undesirably increase the time it takes to process information by the given resource.

Additionally, an IR system having multiple front end modules may generate simultaneous requests for use of a given resource. For example, a voice front end may generate a search request for a search engine at the same time a data front end generates another search request for the search engine. Receiving simultaneous requests to use a given resource provides an often erratic use profile for the given resource. This leads to undesirable and unpredictable response times to process the information within the search requests.

While an IR system may be enhanced by having multiple front end modules and delivery modules, the enhancement may result in increased, undesirable, and unpredictable response times for users of the IR system. Increasing the response time is undesirable because users may become disenchanted with the IR system and discontinue their use of the system. Furthermore, having unpredictable response times is undesirable because users may perceive that something is wrong within the IR system.

In summary, there is a need for a general solution for integrating multiple input, processing, and delivery mechanisms within an IR system via an adaptive routing architecture that (1) maintains a desirable level of response time for users of the IR system, (2) provides a level of abstraction for a common interface between modules of the IR system, (3) is extensible and adaptive for future growth within the IR system, (4) intelligently manages use of the IR system's resources in order to enhance a response time when using the IR system, and (5) adaptively routes information based upon the availability or use profile of resources within the IR system.

SUMMARY OF THE PRESENT INVENTION

The present invention generally provides methods for routing packet-based information between an origination module and a destination module within an information retrieval system. The origination module is a software module that uses a routing architecture within the information retrieval system to adaptively route the information to another software module called the destination module. The process of adaptively routing is accomplished based upon how the destination module is being used. The methods may be carried out by a single processor computer system or a distributed computer system with multiple processors.

Stated generally, the method begins with a step of receiving information, such as a search request. Next, the information is formatted into a packet by providing four parts. A first part of the packet includes a destination designation corresponding to the destination module. A second part of the packet includes an origination designation corresponding to the origination module. A third part of the packet includes data. The data is derived from the information received and may have multiple elements. Finally, a fourth part of the packet includes an action designation. The action designation corresponds to a desired action to be performed by the destination module on the data. Thus, each part of the packet is formatted from the information by the origination module.

Referring again to the method, the packet is then transmitted to the routing architecture. Under control of the routing architecture, the packet is adaptively routed to the destination module depending upon how the destination module is being used. In this manner, the routing architecture is able to route the packet so that the packet can be quickly processed by the destination module.

In one aspect of the present invention, the data within the packet includes elements for a search request. In this situation, the routing architecture adaptively routes the packet by ordering the elements within the packet's data and then routing the packet to the destination module. Ordering the elements may make processing of the packet more efficient and take less time.

Typically, the elements are ordered by determining a number of database records corresponding to each element within the data of the packet. The elements are then ordered based upon the respective number of records corresponding to each element. In an embodiment of the present invention, the elements are ordered based upon the smallest of the respective number of records corresponding to each of the elements. Thus, the routing architecture may adaptively route the packet by ordering the elements within the packet and then routing the packet to the appropriate destination module.

In another aspect of the present invention, the routing architecture may adaptively route the packet to the destination module by determining if another packet is in a queue associated with the destination module. A queue is an ordered memory structure used as a temporary storage mechanism for packets not yet processed by a destination module. If another packet is in the queue, then the routing architecture may adaptively route the packet by creating an additional destination module as a created module. The created module may be a software module in a multi-threaded software environment executing on a single processor of the information retrieval system. The created module may also be a software module dedicated to one of multiple processors within the information retrieval system.

In yet another aspect of the present invention, the routing architecture may adaptively route the packet to the destination module by sending an interrupt to the destination module. The interrupt is typically sent if the packet is not processed by the destination module within a threshold period of time. The interrupt causes the destination module to process the packet in a timely fashion. Typically, the interrupt causes the destination module to process the packet by placing the packet within a designated position in the destination module's queue. The designated position maintains the next packet to be processed by the destination module.

More particularly described, an embodiment of the present invention provides a more detailed method for routing information between an origination module and a destination module using a routing architecture within an information retrieval system. Pursuant to this embodiment, information is received by the origination module. The information, such as a search request, has one or more elements. The elements from the information are used to create a data packet. Typically, the elements are arranged within the data packet in an initial order.

Next, the information is formatted into a router packet by providing various parts. Typically, the parts of the packet are defined in a router library. A first part of the router packet includes a destination designation corresponding to the destination module. A second part of the router packet includes an origination designation corresponding to the origination module receiving the information. A third part of the router packet includes the data packet created from the information. A fourth part of the router packet includes an action designation. The action designation corresponds to a desired action to be performed by the destination module using the data packet's elements from the information received. Additionally, a fifth part of the router packet may include a size designation corresponding to the size of the router packet as well as a packet sequence number referencing the association of the router packet to a group of router packets. Thus, the router packet is formatted.

After the router packet has been formatted, the router packet is transmitted by the origination module to the routing architecture. Once transmitted to the routing architecture, the destination designation within the router packet is interpreted or read to determine where to route the router packet. Under control of the routing architecture, the packet is then adaptively routed to the destination module depending upon how the destination module is being used. In this manner, the routing architecture is able to quickly and efficiently route the router packet so that the packet can be quickly processed by the destination module.

In one aspect of the present invention, the router packet may be adaptively routed by arranging the initial order of the elements in the data packet into an optimized order and routing the router packet to the destination module. Typically, the step of arranging the initial order into the optimized order is accomplished by determining a number of records in a database that correspond to each of the elements in the data packet. Once the number of records is determined for each element, the initial order of the elements is arranged into the optimized order based upon the respective number of records corresponding to each of the elements. In an embodiment of the present invention, the first element in the optimized order has the smallest of the respective number of corresponding records when compared to the number of records corresponding to the other elements. Thus, the routing architecture may adaptively route the router packet by arranging the elements into the optimized order and then routing the router packet to the appropriate destination module.

In another aspect of the present invention, the routing architecture may adaptively route the router packet to the destination module by determining if another router packet is in a queue associated with the destination module. A queue is an ordered memory structure used as a temporary storage mechanism for router packets not yet processed by a destination module. If another router packet is in the queue, then the routing architecture may adaptively route the packet by creating a new module in memory before routing the router packet to the new module.

The new module is a copy of the destination module. Creating such a copy of the destination module, the routing architecture advantageously adapts the available resources within the information retrieval system to meet the needs for routing and timely processing of router packets. The new module may be a software module in a multithreaded software environment executing on a single processor of the information retrieval system. The new module may also be a software module dedicated to one of multiple processors within the information retrieval system.

In yet another aspect of the present invention, the routing architecture may adaptively route the router packet to the destination module by placing the router packet in a position within the destination module's queue. If the router packet is not processed by the destination module within a threshold period of time, an interrupt may be sent to the destination module. The interrupt causes the destination module to process the packet in a timely fashion. Typically, the interrupt causes the destination module to cancel its current processing activity, thus allowing the destination module to become free to process the router packet.

Then, the destination module is caused to process the router packet by changing the position of the router packet within the queue. The position of the router packet is changed to another position designating the router packet to be the next packet processed by the destination module.

Although the exemplary embodiments of the present invention are directed towards methods for adaptively routing information, it should be understood that the present invention is not limited to the embodiments described herein.

In summary, it is an object of the present invention to provide a system and method for routing information between an information retrieval system's origination module and destination module using the information retrieval system's adaptive routing architecture.

It is a further object of the present invention to provide a general solution for integrating multiple input, processing, and delivery mechanisms within an information retrieval system via an adaptive routing architecture.

It is still a further object of the present invention to provide a method for routing information between an information retrieval system's origination module and destination module that maintains a desirable level of response time for users of the information retrieval system.

It is another object of the present invention to provide a routing architecture having a level of abstraction that serves as a common interface between modules of the information retrieval system.

It is also an object of the present invention to provide an information retrieval system's routing architecture which is extensible and adaptive for future growth within the information retrieval system.

It is yet another object of the present invention to provide an information retrieval system's routing architecture which intelligently manages use of the system's resources in order to enhance a response time with respect to a search query.

It is an additional object of the present invention to provide an information retrieval system's routing architecture which adapts to the availability or use profile of resources within the information retrieval system.

It is still a further object of the present invention to rearrange the order of search request elements, which have been routed by the routing architecture, into an optimized order so as to enhance the speed of a database search.

The present invention and its object and advantages, those described above and otherwise, will be appreciated from studying the following detailed description and drawings, and the appended claims.

BRIEF DESCRIPTION OF THE DRAWINGS

FIG. 3 is a flow diagram illustrating steps of the preferred method for routing information between an origination module and a destination module using an adaptive routing architecture within an information retrieval system.

FIG. 5 is a flow diagram illustrating steps of the preferred method for arranging the order of elements in a data field of a router packet after being routed by an adaptive routing architecture.

DETAILED DESCRIPTION

Definitions

Figure 1:
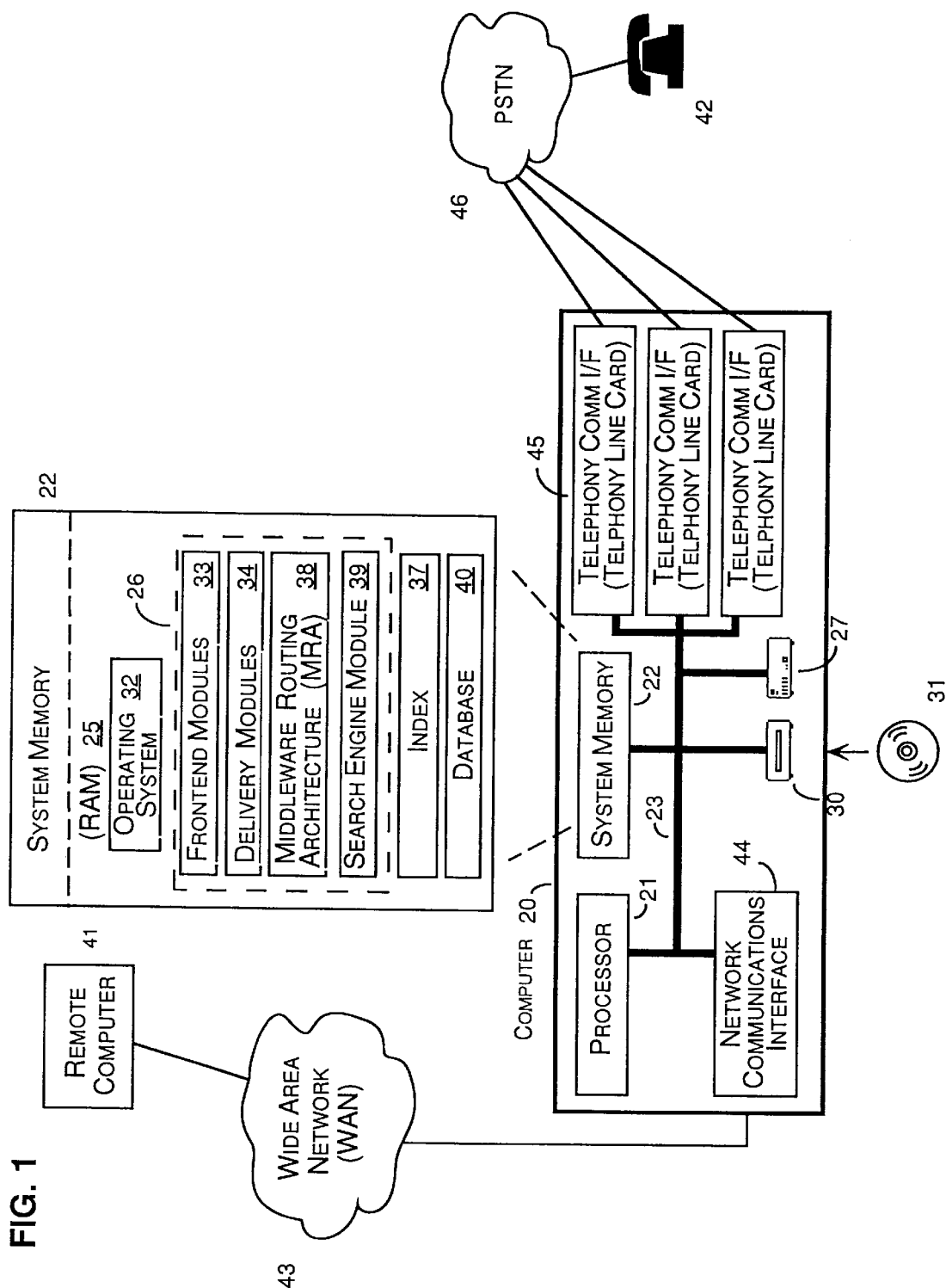
FIG. 1 is a block diagram of a computer system that provides an exemplary operating environment for an embodiment of the present invention.

Throughout the detailed description of embodiments of the present invention, terms familiar to one skilled in the art will be used. Additionally, the following definitions should be used in reference to embodiments of the present invention described herein:

"ADAPTIVELY ROUTING"—routing a router packet based upon a status of a destination module in an information retrieval system.

"DATA PACKET"—part of a router packet. The data packet is derived from information received by an origination module.

"DESTINATION MODULE"—a software module designated to receive information contained within a router packet.

"ORIGINATION MODULE"—a software module responsible for creating a router packet and transmitting it to a routing architecture.

"QUEUE"—a data structure in memory which operates as temporary storage for a pending router packet.

"ROUTER PACKET"—a specially formatted data structure used when communicating information from a device or software module to another device or module.

"ROUTE"—to deliver information, such as router packets, in an information retrieval system.

"ROUTING ARCHITECTURE"—a software module responsible for routing a router packet between an origination module and a destination module.

"SEARCH ENGINE"—a software module capable of searching a database for specific information.

"STATUS"—information regarding how a particular destination module is being currently used (e.g., processing a router packet, has another router packet waiting to be processed, etc.)

Introduction

The present invention is directed to a system and methods for routing information from an origination module to a destination module using a routing architecture within an information retrieval system ("IR system"). In general, the routing architecture adaptively links the origination module and the destination module within the IR system in a manner which is advantageously uniform, efficient, and timely.

In an embodiment of the present invention, information is received by the origination module. This information may be a search request destined for the search engine module. The origination module creates a router packet having data related to the received information. The router packet may be specially formatted, according to a common router library, to include a destination designation, an origination designation, a data packet, a size designation, and an action designation. The destination designation and the origination designation correspond to the destination module and the origination module, respectively. The data packet is derived from the data (e.g., elements of the information). The size designation corresponds to the memory size of the router packet. The action designation corresponds to an action to be performed by the destination module on the data packet. Thus, the router packet is a communication mechanism created by a module (the origination module) within the IR system used when routing information within the IR system.

After the router packet is formatted, the router packet then is transmitted to the routing architecture within the IR system. The routing architecture handles the router packet by first determining where to route the router packet within the IR system. Furthermore, the routing architecture is then able to intelligently use the IR system's resources in order to adaptively route the router packet and bring about an optimal response time for the router packet.

One way of intelligently using the IR system's resources is to place the router packet in a queue associated with the destination module. The queue is maintained within the routing architecture and operates as a holding place for pending packets waiting to be processed by the destination module. If another router packet is already waiting in the queue, then the routing architecture may create a new copy of the destination module to adaptively meet the needs of the latest routing packet. Alternatively, the routing architecture may place the router packet in a position within the destination module's queue. If the router packet is not processed by the destination module within a threshold time period, the routing architecture interrupts the destination module. The routing architecture then places the router packet in a designated position within the queue. The designated position stores the packet which is next to be processed. This reduces the response time to process the router packet.

Another way of intelligently using the IR system's resources involves ordering elements of search request information. If the information received is a search request destined for a search engine within the IR system, the data includes elements of the search request. The elements are arranged in an initial order. The order of the elements may be ordered or arranged into an optimized order. The elements are arranged into the optimized order prior to searching the IR system's database so that the search engine module can more efficiently search the database. In summary, the creation and use of a routing architecture for dynamically and adaptively routing packets of information within an IR system is the general focus of the present invention.

General Information on Computer Related Embodiment

Although the preferred embodiment is generally described in the context of specific software modules in an exemplary IR system used within an exemplary computer system, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the software modules may occur locally in a stand-alone or dedicated manner relative to one or more processors or remotely in a client/server manner. Examples of such distributed computing environments include local area networks, enterprise-wide computer networks, and the global Internet. Other methods and system implementations will occur to those skilled in the art.

The detailed description which follows is represented largely in terms of processes and symbolic representations of operations by a conventional computer. The processes and operations performed by the computer, in both a stand-alone environment and a distributed computing environment, include the manipulation of signals by a processor and the maintenance of these signals within data sets, such as the database, and data structures, such as the index or packet. Each of these data sets and data structures are resident in one or more memory storage devices. Basically, a data set is a collection of related information in separate elements that are manipulated as a unit. A data structure is a structured organizational scheme that encapsulates data in order to support data interpretation and data operations. The data structure imposes a physical organization upon the collection of data stored within a memory storage device and represents specific electrical or magnetic elements. In the context of the present invention, a data structure can be created from the separate elements or objects of a data set or another data structure. For example, a router packet may contain another packet of information called a data packet.

For the purposes of this discussion, a method or process is generally conceived to be a sequence of computer-executed steps leading to a desired result. These steps generally require physical manipulations of physical quantities.

In addition, it should be understood that the methods and systems described herein are not related or limited to any particular computer (standalone or distributed) or apparatus. Furthermore, the methods and systems are not related or limited to any particular communication architecture. Thus, one skilled in the art will be able to implement the systems and methods of the present invention with general purpose machines or specially customized programmable devices according to the teachings described herein.

Referring now to the drawings, in which like numerals represent like elements throughout the several figures, aspects of the present invention and the preferred operating environment are described.

The Operating Environment for Embodiments of the Invention

FIG. 1 and the following discussion are intended to provide a brief, general description of an exemplary computing environment in which the present invention may be implemented and operated. Embodiments of the invention are described in the general context of software program modules that run on an operating system in conjunction with a computer. Generally, program modules include routines, programs, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Those skilled in the art will immediately appreciate that FIG. 1 and the associated discussion are intended to provide a brief, general description of exemplary computer hardware and program modules, and that additional information is readily available in the appropriate programming manuals, users guides, and similar publications.

Referring now to FIG. 1, an exemplary computer system for implementing the present invention includes a conventional computer 20, including a processor 21, a system memory 22, and a system bus 23 that couples the system memory 22 to the processor 21. Although not shown in FIG. 1, the exemplary computer system for implementing the present invention may include additional processors, each of which are coupled to the system memory 22. In this alternative configuration, the additional processors are deemed to be adjunct processors capable of being dedicated to particular software processes concurrently executing within the computer 20.

The system memory 22 includes random access memory (RAM) 25. The computer 20 further includes a hard disk drive 27 and an optical disk drive 30 (e.g., a disk drive that reads from a CD-ROM disk 31 or reads from or writes to other optical media). The hard disk drive 27 and the optical disk drive 30 are connected to the system bus 23. The drives and their associated computer-readable media provide non-volatile storage for the computer 20. Although the description of computer-readable media above includes the hard disk drive 27 and the optical disk 31, such as a CD, it should be appreciated by those skilled in the art that other types of media which are readable by a computer, such as removable magnetic disks, magnetic cassettes, flash memory cards, digital video disks and tapes, Bernoulli cartridges, and the like, may also be used in each of the exemplary operating environments described with regard to FIG. 1.

A number of program modules may be stored in the drives 27, 30 and RAM 25, including an operating system 32 and a variety of other software program modules. In an embodiment of the present invention, an example of such software modules is a group of software modules collectively referred to as interactive information retrieval system modules 26 (IR system modules). The IR system modules 26 preferably include the following software modules:

one or more front end modules 33,
one or more delivery modules 34,
a middleware layer of software 38 for intelligently and adaptively routing information between others of the IR system modules 26, and a search engine module 39 (which interacts with a database 40).

When any of the IR system modules 26 are used, the processor 21 may only bring a portion of the module into memory at a time due to the size of the module. For example, the operating system 32 and the database 40 are shown as residing within RAM 25. However, in the exemplary embodiment, only a portion of these software modules are maintained within RAM 25 due to their prohibitive size. The software modules comprising the IR system modules 26 are discussed in greater detail below with regard to FIG. 2.

The operating system 32 provides the basic interface between the computers hardware and software resources, the user, and the IR system modules 26. In the exemplary operating environments described with regard to FIG. 1, the operating system 32 is preferably a real-time operating system, such as the SOLARIS operating system, produced by SunSoft, a division of Sun Microsystems, Inc. A real-time operating system is desired in order to provide adequate response when searching and interacting with multiple users. The SOLARIS operating system has a multithreaded, real-time UNIX kernel capable of supporting symmetric multiprocessing. Those skilled in the art will appreciate the need for real-time, multithreaded performance in information retrieval applications in order to support an adequate level of transactional performance. Furthermore, those skilled in the art will be familiar with multiprocessing operating systems. Additional information regarding the SOLARIS operating system is available by reference to system manuals published by Sun Microsystems and other widely available literature on UNIX operating systems.

As with most conventional computer systems, a user may enter commands and information into the computer 20 through a keyboard (not shown) and an input or pointing device, such as a mouse (not shown). These and other input devices are often connected to the processor 21 through a serial port interface (not shown), such as a game port or a universal serial bus (USB), connected to the system bus 23. A monitor (not shown) or other type of display device can also be connected to the system bus 23. In addition to the monitor, computers such as the computer 20 typically include other peripheral output devices (not shown), such as speakers, printers, and backup devices.

In the exemplary embodiment, a user typically interacts with the computer 20 when the computer 20 functions in a server capacity. In this capacity, the computer 20 can service a remote programmable device (such as a remote computer 41), or a telecommunications device (such as a conventional telephone 42), each of which is logically connected to the computer 20.

The remote computer 41 may be a server, a router, a peer device, or other common network node. Typically, the remote computer 41 includes many or all of the elements described relative to the standalone computer 20. The logical connection between the remote computer 41 and the computer 20 depicted in FIG. 1 is a data communications network, such as a wide area network (WAN) 43. Other examples of data communications networks include enterprise-wide computer networks, intranets, or the global Internet. A communications interface, such as a network communications interface 44 in the computer 20, links the WAN 43 and the computer 20. However, the logical connections to the computer 20 may also be a local area network (LAN) (not shown) that is commonplace in offices. Typically, a user of the remote computer 41 interacts with the computer 20 via such logical connections in order to search the database 40 for information and to respond to scripted questions posed by the computer 20.

A telephony communication interface 45 (also known as a telephony line card) connected to a conventional public switched telephone network 46 (PSTN) provides the logical connection between the computer 20 and the conventional telephone 42. In this manner, the user can interact with the computer 20 with voice responses via a conventional telephone 42 or other telephonic device. In the preferred embodiment, the telephony communication interface 45 is a Model D/160SC-LS telephone line interface card having an Antares 2000 digital signal processing (DSP) card, both of which are manufactured by Dialogic Corporation of Parsippany, New Jersey. Both the network communications interface 44 and the telephony communication interface 45 are generally referred to as "communication interfaces" because the computer 20 provides the service of processing data inquiries through both of these interfaces. It will be appreciated that the network and telephone connections shown are exemplary and other means of establishing a communications link between the computer 20 and the remote computer 41 or conventional telephone 42 may be used.

As discussed earlier, the preferred embodiment of the present invention is embodied in the IR system modules 26 which are designed to operate in conjunction with SunSoft's SOLARIS operating system in a single processor computer system 20. However, one skilled in the art will quickly recognize that the invention may be implemented for use with other computer architectures, such as multiprocessor systems where threads are dedicated to distinct processors.

From this brief description, it should be appreciated that operating systems, such as the "SOLARIS" operating system, and networking architectures are quite complex and provide a wide variety of services that allow users and programs to utilize the resources available in the computer or in other computers in a distributed computing environment. Those skilled in the art will be familiar with operating systems, networking architectures and their various features. Likewise, those skilled in the art will appreciate that the IR system modules 26 provide a wide variety of features and functions in addition to those included in the brief description presented above.

Figure 2:
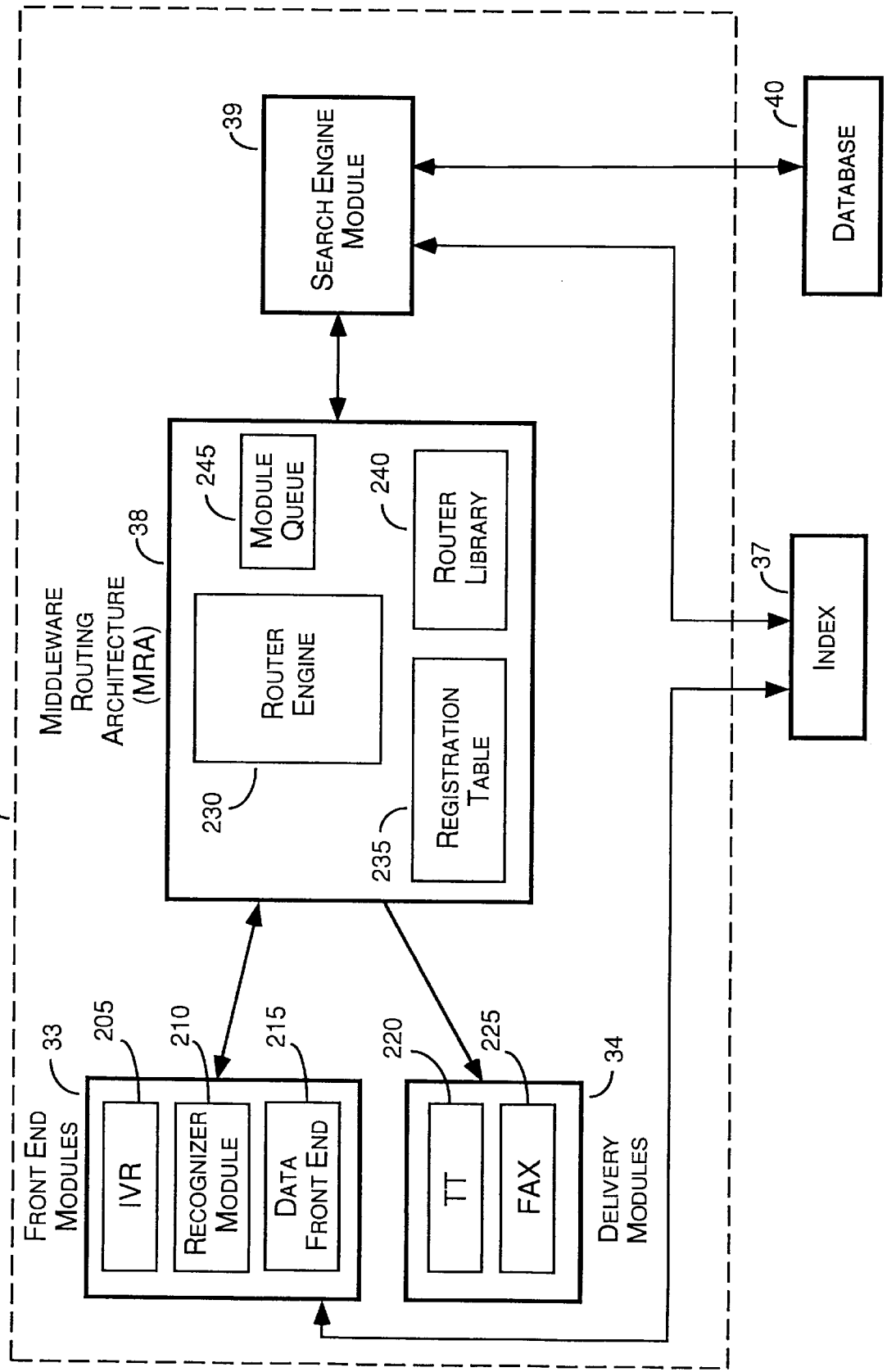
FIG. 2 is a diagram illustrating software components and their operative interrelationships in the exemplary embodiment of the present invention.
Figure 4A:
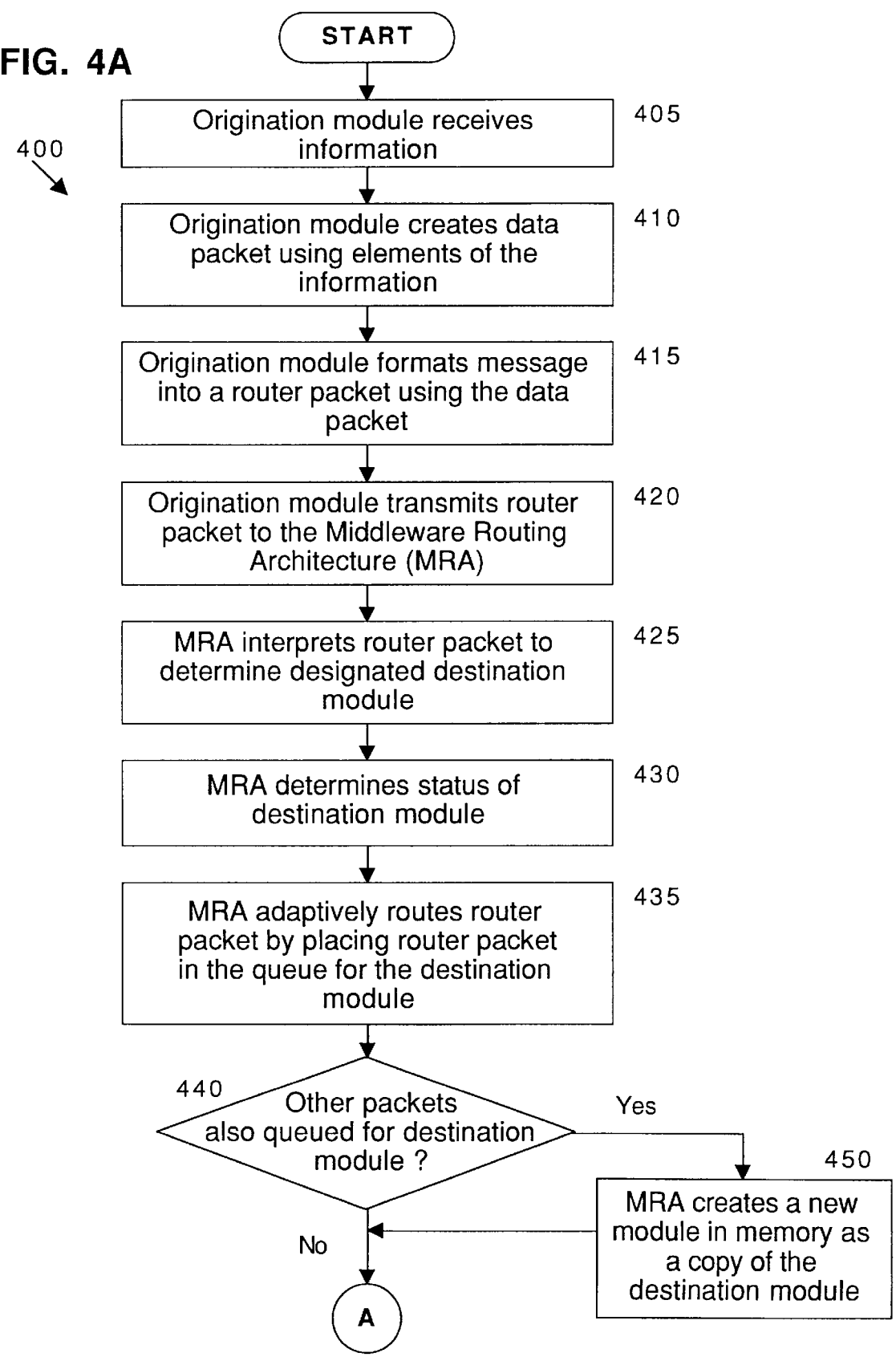
FIG. 4, consisting of FIGS. 4A and 4B, is a detailed flow diagram illustrating steps of the preferred method for routing information between an origination module and a destination module using an adaptive routing architecture within an information retrieval system.

Turning now to the remaining figures, an exemplary embodiment of the present invention is described. FIG. 2 is a diagram illustrating the middleware routing architecture and its interrelationships with other software components in the exemplary embodiment of the present invention. FIG. 3 is a flow diagram illustrating the preferred steps for routing information between an origination module and a destination module using the middleware routing architecture. FIGS. 4A- 4B are flow diagrams illustrating the preferred steps for routing information between an origination module and a destination module in greater detail. FIG. 5 is a flow diagram illustrating the preferred steps as to how elements from a router packet may be rearranged into an optimized order.

Software Modules within the Exemplary IR System

The heart of the IR system modules 26 is a software component called the search engine module 39. The search engine module 39 may also be referred to herein as a search engine. Information, such as a search request, is routed to the search engine module 39 which searches the database 40. The search results are then routed or sent out from the search engine module 39. The middleware routing architecture (MRA) 38 provides such routing services in an adaptive manner while advantageously enhancing use of the other software components within the IR system modules 26. FIG. 2 is a diagram illustrating the MRA 38 and its operative interrelationships to other software components in the preferred embodiment of the present invention.

Middleware Routing Architecture

Turning now to FIGS. 1 and 2, the MRA 38 connects various front end modules 33 and delivery modules 34 to the search engine module 39 within the IR system 26. The MRA 38 contains a variety of software modules including a router library 240, a router engine 230, a registration table 235, and an exemplary module queue 245, each of which are used to provide such connecting or routing services within the R system 26.

As noted, the MRA 38 contains a router library 240 as a software schedule. The router library 240 is a library of code which may be conventionally linked to other software modules as a dynamic library. The router library 240 defines router packets and includes functions that may be called by any of the modules connected to the MRA 38 in order to route the router packets. The names and addresses of such connected software modules are maintained within the registration table 235. In other words, the router library 240 defines a uniform programming interface for an origination module, such as one of the front end modules 33. The origination module uses the router library 240 to create and send a router packet to a destination module, such as the search engine module 39, within the IR system 26. By defining a uniform programming interface, the router library 240 provides a common and extensible language reference with respect to packets of information to be sent between modules connected to the MRA 38.

A router packet used within the IR system 26 conforms to a predetermined format defined by the router library 240. In the exemplary embodiment, a router packet is a data structure formatted into six distinct and interrelated parts or fields: [Destinatian Designation], [Action Designation], [Size], [Packet Sequence Number], [Data], and [Origination Designation]. These distinct fields of a router packet are defined in Table 1 below:

TABLE 1

| Fields of the Router Packet | Description |
| --- | --- |
| Destination Designation | Software module designated to receive the router packet when routed by the MRA 38 |
| Action Designation | Desired action to be performed on the data by the designated destination module |
| Size | Memory size of the router packet |
| Packet Sequence Number | Association of the router packet to a group of router packets |
| Data | Derived from information received by the designated origination module |
| Origination Designation | Software module designated to be the sender of the router packet |

Referring now to Table 1, the individual fields of the preferred router packet are described. The Size field is the part of the router packet indicating the memory size of the router packet.

The Destination Designation field indicates the destination module within the IR system modules 26 which is to receive the router packet. Typically, the Destination Designation refers to the name and address of the destination module as registered within the registration table 235.

The Action Designation field indicates what is to be done with data contained within the router packet. For example, the Action Designation may be a request to search the database 40 when the router packet embodies a search query being sent via the MRA 38 from one of the front end modules 33 to the search engine module 39.

The Size field is the part of the router packet containing the overall memory size of the router packet. Typically, the Size field is expressed in terms of bytes of memory.

The Packet Sequence Number field is the part of the router packet referencing an association of the router packet to a group of router packets. In particular, the Packet Sequence Number field designates a relative position of the router packet in a sequence of the router packets in the group. This is useful when the origination module has to split up data into multiple packets for collective processing at the designated destination module. For example, the router packet may be one of a group of three related router packets collectively containing a large search query to be used by the search engine module 39.

The Data field is the part of the router packet containing data received by the origination module and which is to be used by the destination module. In the exemplary embodiment, the Data field of the router packet contains an embedded data packet having specific elements of the information as well as the number of elements in the data packet.

The Origination Designation field indicates the origination module within the IR system modules 26 which is responsible for creating the router packet and transmitting it to the MRA 38. Typically, the Origination Designation refers to the name and address of the origination module as registered within the registration able 235.

In summary, the preferred router packet is defined by the router library 240. Using the router library 240, any of the registered IR system modules 26 may use the MRA 38 to adaptively send a router packet to any of the other registered IR system modules 26.

As noted, the MRA 38 contains a router engine 230 as a software module. The router engine 230 adaptively controls how router packets are handled and routed to an appropriate destination module. In order to handle or process a router packet, the router engine 230 interprets or reads the contents of a router packet transmitted from an origination module, such as one of the front end modules 33. Once the router engine 230 has interpreted the router packet to determine the designated destination module, the router engine 230 may "adaptively" route the router packet to the appropriate module (destination module) registered in the registration table 235 as being connected to the MRA 38.

Adaptive routing of a router packet may be implemented in a variety of ways. Adaptive routing of a router packet by the MRA 38 depends on which destination module is designated by the router packet and how that destination module is being currently used in the IR system. For example, how a destination module is being used may depend upon the number of router packets pending for the destination module or whether the destination module is currently processing a router packet. In other words, adaptively routing the router packet is routing the router packet based on how the destination module is being used in order to advantageously increase the speed at which the router packet can be processed by the destination module.

With respect to the routing of a router packet, the router engine 230 typically monitors a queue 245 associated with a destination module when adaptively routing a router packet to the destination module. The queue 245 is a data structure in memory which operates as temporary storage for pending router packets addressed to a specific destination module. For example, router packets designating the search engine module 39 as the destination module may be temporarily stored within the search engine module's queue 245.

If there are no pending router packets in the queue 245 associated with the destination module and the destination module is not already processing another router packet, the router engine 230 adaptively routes the router packet directly to the destination module. In this situation, the destination module is able to immediately process the router packet.

If there is already a router packet being processed by the destination module, the router engine 230 adaptively routes the router packet by storing the current router packet in the queue 245 to await processing as soon as possible. If there is already another router packet pending within the queue 245, the router engine 230 may also adaptively route the router packet by creating another destination module in order to quickly process the current router packet. If the current router packet is not processed within a desirable amount of time, the router engine 230 may also adaptively route the router packet by sending an interrupt to the destination module to cancel any processing by the destination module. Furthermore, the router engine 230 may ensure that the current router packet is next to be processed by the destination module.

In summary, the MRA 38 uses its components to advantageously provide a communication and routing mechanism between various front end modules 33, delivery modules 34, and the search engine module 39 within the IR system 26. The router engine 230, in conjunction with the other components of the MRA 38, adaptively routes a router packet to speed processing time of the router packet and to attempt to reduce the response time related to the router packet. The preferred steps involved in adaptively handling a router packet are described in more detail below with regard to FIGS. 3, 4A, and 4B.

Index to the Database

When a router packet is routed by the MRA 38 to the search engine module 39, the router packet typically represents information defining a search request for the search engine module 39. In the exemplary embodiment, the information defining the search request is typically represented by elements selected from the index 37 to the database 40. In other words, elements from the index 37 are selected to define the search request.

The index 37 is a structured guide or tool associated with the database 40, used to find information within the database 40. In the exemplary embodiment, the index 37 contains elements, also known as keywords and categories, relating to records of information within the database 40. Typically, these keywords or categories are referenced by numeric identifiers. Thus, the user can create a search request using the identifiers for specific keywords and categories within the index 37.

In an example where the database 40 contains Restaurant advertising information, the index 37 may include the categories and identifiers as listed in Table 2 below:

TABLE 2

| Category Description | Category Type within Index | Numeric Identifier of Category |
|---|---|---|
| Restaurants | LOB | 2760 |
| Chinese | QLOB | 1080 |
| Takeout | Amenity | 100 |

Referring now to Table 2, "Restaurants," "Chinese," and "Takeout" are each a description of a category by which the information within the database 40 may be organized. Each of these categories is one of a predefined type of category within the Index 37. As previously mentioned, each category is referenced by a distinct numeric identifier.

For example, the Restaurant category is a LOB (Line of Business) type of category having a numeric identifier of 2760. The Chinese category is a QLOB (Qualified Line of Business) type of category having a numeric identifier of 1080. The Takeout category is an Amenity type of category having a numeric identifier of 100.

If the user desires to use the IR system modules 26 to search the database 40 for Chinese restaurants with the ability to serve takeout food, an exemplary search request would include the above three listed categories and their respective identifiers. The elements in such an exemplary search request would be as follows: LOB 2760, QLOB 1080, Amenity 100.

Once the elements of the search request (i.e., information defining the search request) have been determined, a router packet may be created based upon the elements of the search requests. If an interactive voice response (IVR) Module 205 is the front end module 33 interfacing with the user, the fields of the resulting router packet in such a situation would be as follows: [Search Engine Module], [Search Request], [115 bytes], [3, LOB 2760, QLOB 1080, Amenity 100], and [IVR Module].

Interaction Between Software Modules within the IR System

Given the above preface on router packets and the functionality of individual software modules within the IR system modules 26, the following provides a description of how the IR system modules 26 interact with each other in an embodiment of the present invention. Returning now to FIGS. 1 and 2, the MRA 38 is generally used to route information within the IR system 26 through the use of router packets generated by an origination module. The router packets are interpreted by the MRA 38 and subsequently routed to a destination module so that the router packets are timely and efficiently processed. The following are two examples of how the software modules within the IR system 26 interact with the MRA 38 according to embodiments of the present invention.

Processing a Search Request by the IR System

The first example illustrates the use of the MRA 38 when the IR system 26 is processing information defining a search request. A user initiates the search request by communicating with the computer 20 via the conventional telephone 42 or via the remote computer 41. More particularly, the user communicates information defining the search request to one of the front end modules 33 of the IR system 26 via one of the above-described communication paths. If the communication path is via the PSTN 46, the module receiving the information may be the IVR module 205. However, if the communication path is via the WAN 43, the module receiving the information may be the data front end module 215. In either situation, the particular front end module 33 receiving the information is deemed in this example to be the origination module.

Once the front end module 33 receives the information defining the search request, the front end module 33 formats the information into a router packet. The format for the router packet is determined by linking the router library 240 to the front end module 33 i.e., the origination module). The front end module 33 transmits the outer packet to the MRA 38 where the parts of the router packet are read and interpreted by the router engine 230. Once interpreted, the router engine 230 determines that the router packet is a search query (based on the action designation) from the front end module 33 (based upon the designated origination module). The router engine 230 also determines that the router packet should be sent to the search engine module 39 (based upon the designated destination module).

Once it is determined that the router packet is to be sent to the search engine module 39, the router engine 230 adaptively routes the router packet. If the queue 245 is empty and the search engine module 39 is not currently processing any other packets, the router packet is routed to the search engine module 39. The search engine module 39 promptly performs a search of the database 40 based on elements within the router packet. However, if there is another router packet being processed by the search engine module 39, the router engine 230 stores the router packet in the queue 245. Once processing of the other router packet is complete, the search engine module 39 then proceeds to process the router packet. In particular, the search engine module 39 performs a search of the database 40 based on elements within the data field of the router packet in the queue 245.

If there is already another router packet pending within the search engine module's queue 245, the router engine 230 can adaptively route the router packet. The router engine 230 can adaptively route the router packet by advantageously creating or instantiating another search engine module 39 in memory. By creating another copy of the search engine module 39, the database 40 can be quickly searched in a more timely manner in accordance with the information defining the search request in the router packet.

If the router engine 230 places the router packet in the search engine module's queue 245, then the router engine 230 monitors the status of the search engine module's queue 245 with regard to the router packet. If the router packet is not processed by the search engine module 39 within a predetermined amount of time, the router engine 230 adapts to the situation. In particular, the router engine 230 preferably sends an interrupt to the search engine module 39. The interrupt halts or cancels the search engine module's 39 processing and changes the order of router packets in the search engine module's queue 245 so that the current router packet is next to be processed.

In this manner, the MRA 38 is used to process information defining a search request by adaptively routing a router packet representing the request from one of the front end modules 33 (an origination module) to the search engine module 39 (a destination module).

Delivering Search Results by the IR System

In the prior example, the MRA 38 is used for communicating a search request from a front end module 33 to the search engine module 39. The search engine module 39 then processes the search request to generate search results. In another example of how the middleware routing architecture is used, the search engine module 39 uses the MRA 38 to send the search results to one of the delivery modules 34.

The process of sending search results is essentially the same as in the prior example, except that the search engine module 39 is now deemed to be the origination module and one of the delivery modules 34 is deemed to be the destination module. The search engine module 39 formats information defining the search results into a router packet and sends the packet to the MRA 38. The router packet is then interpreted and transmitted to a queue associated with the appropriate delivery module 34, such as a text-to-speech (TTS) module 220 or a fax module 225. As previously described, the router engine 230 adaptively routes the packet to the appropriate delivery module's queue depending on the use and availability of the appropriate delivery module 34. Once the appropriate delivery module 34 has received the router packet, the search results may be transmitted to the user in the format corresponding to the appropriate delivery module 34.

In summary, the MRA 38 is a software module providing intermodule connectivity within the IR system modules 26 in a flexible, adaptive, and abstract manner.

Flow Diagram for Using the Middleware Routing Architecture

FIGS. 3 and 4 are flow diagrams describing the preferred steps from embodiments of the present invention for routing information within an information retrieval system. FIG. 3 is a flow diagram illustrating steps of the preferred method for routing information between an origination module and a destination module using an information retrieval system's adaptive routing architecture, such as the MRA 38.

Referring now to FIGS. 1, 2, and 3, the method 300 begins at step 305 where an origination module, such as the IVR module 205, receives information. As previously described, this information may be in the form of a search request. At step 310, the origination module formats the information into a router packet. When the origination module formats the information, the origination module preferably refers to the router packet format in the router library 240 linked to the IVR module 205.

At step 315, the origination module transmits the router packet to a routing architecture, such as the MRA 38, within the information retrieval system. In the exemplary embodiment, the origination module is capable of transmitting a router packet to the MRA 38 using a uniform programming interface defined within the router library 240. As part of such a uniform programming interface, the preferred router library 240 defines a function, such as msgrt_send, called by the origination module to transmit the router packet to the routing architecture.

At step 320, once the router packet has been transmitted, the MRA 38 determines the status of the software module designated as the destination module. The MRA 38 preferably determines the destination module's status by (1) reading or interpreting the router packet's Destination Designation field, (2) monitoring the contents of the destination module's queue for pending router packets, and (3) monitoring the designated destination module for processing activity.

At step 325, the MRA 38 places the router packet in the destination module's queue. In embodiments of the present invention, the destination module's queue is typically a FIFO (first in first out) type of ordered memory structure. A router packet is usually placed at the bottom position of the queue and the destination module usually retrieves router packets from the top position of the queue. In this way, if multiple router packets are placed within the destination module's queue, the earliest router packet to arrive in the queue will be at a designated position ,such as the top position.

At step 330, if other router packets are existing within the destination module's queue, step 330 proceeds to step 335. At step 335, the MRA 38 creates an additional copy of the destination module in order to expedite routing and processing of the router package before proceeding to step 340. Otherwise, step 330 proceeds directly to step 340.

The MRA 38 is deemed to be adaptive because it can create the additional copy of the destination module. In an example, a router packet from the IVR module 205 is sent to the MRA 38. The router packet is bound for the search engine module 39 and the MRA 38 determines the search engine module's queue 245 has other router packets already in the queue 245. The MRA 38 adapts by creating another search engine module 39 in memory in order to handle the router packet in a more timely manner.

Returning now to FIGS. 1–3, at step 340, if the current router packet has been processed by the destination module within a predetermined threshold period of time, the method 300 ends after step 340. However, if the router packet has not been processed by the destination module within a predetermined threshold period of time, step 340 proceeds to step 345.

The time it takes a destination module to "process" a router packet is deemed to be the time it takes to read the router packet from its queue and complete the designated action associated with the router packet. The predetermined threshold period of time depends on the individual destination module because different types of modules may take different amounts of time, respectively, to normally process a router packet and be ready to accept another router packet from the MRA 38.

In an example where the destination module is the search engine module 39, the predetermined threshold period of time is a limit past which the search is taking too long. In the exemplary embodiment, the predetermined threshold period of time related to the search engine module is a timeout period of five seconds.

At step 345, the MRA 38 sends the destination module an interrupt to halt or cancel any processing activity currently being performed by the destination module. In this manner, the MRA 38 clears the destination module for the router packet. Furthermore, the MRA 38 sends the router packet to the top position of the destination module's queue at step 350 in order to route the router packet and ensure that the destination module processes the router packet in a prompt fashion.

In summary, the MRA 38 receives the router packet and adaptively routes the router packet to the appropriate destination module.

In the exemplary embodiment, the MRA 38 adaptively routes the router packet by (1) adding another destination module and routing the router packet to the new module, (2) interrupting the destination module and making sure that the router packet is the next to be processed, and (3) by specially ordering elements within the router packet and routing the ordered elements to the destination module. It is believed that each of these ways of adaptively routing the router packet are advantageously beyond the mere functionality of conventional routers and gateways.

Detailed Flow Diagram for Using the Middleware Routing Architecture

More particularly described, FIGS. 4A–4B are detailed flow diagrams illustrating steps of the preferred method for routing information between an origination module and a destination module using an adaptive routing architecture, such as the MRA 38, within an information retrieval system.

Referring now to FIGS. 1, 2, and 4, the method 400 begins at step 405 where an origination module, such as one of the front end modules 33, receives information. The information may define a search request coming from a user of the IR system modules 26. Alternatively, the information may define search results coming from the search engine module 39.

At step 410, the origination module creates a data packet. The data packet is derived from elements of the received information from step 405. At step 415, the origination module formats the message into a router packet using the data packet in the data field of the router packet. At step 420, the origination module transmits the router packet to the MRA 38.

Once the router packet has been transmitted to the MRA 38, the MRA 38 reads or interprets the contents of the router packet to determine the destination module at step 425. Determining the destination module is preferably accomplished by reading the contents of the Destination Designation field of the router packet.

At step 430, the MRA 38 determines the status of the software module designated as the destination module. In general, the status of the destination module includes information describing the destination module and its current processing activity. As previously mentioned, the MRA 38 is capable of monitoring a destination module's queue and its processing activity. The MRA 38 preferably determines the destination module's status (for adaptive routing purposes) by checking the contents of the destination module's queue for pending router packets and checking the designated destination module for processing activity.

At step 435, the MRA 38 adaptively routes the router packet by placing the router packet within the destination module's queue, typically at the bottom position of the queue. As previously mentioned, a router packet is usually placed at the bottom position of the queue while the destination module retrieves router packets from the top position of the queue. In this way, if multiple router packets are placed within the destination module's queue, the earliest router packet and related router packets (i.e., those router packets in a sequenced group) to arrive in the queue will be on the top position designated as the next to be processed.

At step 440, if other router packets are not queued nor existing within the destination module's queue, step 440 proceeds to step 445 on FIG. 4B. However, if other router packets are queued or existing within the destination module's queue, step 440 proceeds to step 450. At step 450, the MRA 38 adaptively routes the router packet by creating a new module in memory as a copy of the destination module before proceeding to step 445 on FIG. 4B. This additional copy of the destination module is created in order to adaptively expedite routing and processing of the router packet.

In the exemplary embodiment, the new copy of the destination module may operate as a single processing thread within the multithreaded software environments of the operating system 32 within the IR system (i.e., the computer 20). In other words, the new destination module is a new process executed by the computer's single processor 21. Those skilled in the art will be familiar with threads and multithreaded software operating and programming environments.

Those skilled in the art will also quickly appreciate how the single processing thread may be dedicated to one of multiple processors (also called adjunct processors) within a multiprocessor computer system. When individually dedicated to a multitude of processors, multiple destination modules may be efficiently operated in order to expedite routing and processing of the router packet. The ability to maintain an adequate level of processing router packets using adjunct processors is important when the use profile of the IR system modules 26 increases. Those skilled in the art will be familiar with multiprocessor computer systems having adjunct processors.

Referring now to FIGS. 1, 2, 4A, and 4B, at step 445, if the current router packet has been processed by the destination module within a predetermined threshold period of time, the method 400 ends after step 445. However, if the current router packet has not been processed by the destination module within the predetermined threshold period of time, step 445 proceeds to step 455.

At step 455, the MRA 38 sends an interrupt to the designated destination module. As a result of receiving the interrupt, the destination module cancels its current processing activity occurring within the destination module at step 460. From these described steps, one skilled in the art will recognize that the MRA 38 has essentially cleared the destination module so that it is ready to process the router packet, at the latest, after expiration of the predetermined threshold period of time. Once the processing activity within the destination module has been canceled, the MRA 38 changes the position of the router packet within the destination module's queue at step 465. Placing the current router packet at a designated position, such as the top position, within the queue causes the destination module to receive and process the current router packet as the next router packet to be processed.

In summary, the MRA 38 receives the router packet and adaptively routes it to the appropriate destination module depending on the monitored status of the destination module and its queue. Once the router packet has been routed, it can be efficiently processed by the destination module.

Rearranging Search Query Elements When Using the Middleware Routing Architecture If the destination module is the search engine module 39, another aspect of the present invention involves enhancing how the router packet is processed by a search engine module. In such a situation, the data within the router packet is typically a search query with multiple elements. Processing of the search query (i.e., searching the database 40) is enhanced when the order of the search query elements is rearranged to an optimized order. FIG. 5 is a flow diagram illustrating steps of the preferred method for adaptively routing the router packet by rearranging the order of elements from the router packet's data field.

Referring now to FIGS. 1–5, the method 500 begins at step 505 where the destination module designated in the router packet is a search engine module, such as the exemplary search engine module 39. At step 510, the router packet is read from its queue, such as the exemplary search engine module's queue 245.

Once the router packet is read, typically by the search engine module 39, steps 515–525 are performed to make processing the search query elements by the search engine module 39 more efficient. In other words, performing step 515–525 allows the search engine module 39 to intelligently process the search query to yield a faster search.

At step 515, the initial order of search query elements is determined from the ordered data components within the router packet. Typically, the data field contains data components which are maintained within the router packet's data field in an initial order. Each data component within the data field is an element of the search query. Furthermore, the order of the data components corresponds to an order of the search query elements used by the search engine module.

At step 520, the search engine module 38 determines which records in the database 40 correspond to each individual element in the search query. When the search query elements are keywords and categories from the database's index 37, determining the records corresponding for each element is preferably accomplished by referring to the relationships between information records in the database 40 and the keywords and categories within the index 37. For example, the search query elements may include LOB 2760, QLOB 1080, Amenity 100. The LOB 2760 element may correspond to 1500 records within the database 40. The QLOB 1080 element may correspond to only 200 records within the database 40. Additionally, the Amenity 100 element may correspond to 50 records in the database 40.

Once the records to elements relationships have been determined, the search engine module rearranges the query order of elements within the search query at step 525 in order to enhance how the router packet is processed by the search engine module 38. This is accomplished by rearranging the order of the search query elements into an optimized order in order to reduce the time the search engine module 39 takes to perform its search of the database 40.

The optimized order of search query elements is also referred to as a "bullseye" ranking or order of the search query elements. The term "bullseye" is used because each element is arranged into an optimized order depending which elements, when used in a search, will produce the best search results. The element which is used to produce the best results (i.e., is first in the optimized order) is akin to being the center of the bullseye. A search using the first element would produce a low number of results, similar to the small area of the bullseye. The next best element in the optimized order is akin to the next ring around the bullseye and so on.

In one embodiment illustrated in FIG. 5, the optimized order depends on the amount of database information related to each element. In such an embodiment, the best search results are achieved when the search produces the smallest amount of information. Alternatively, the optimized order may also depend on other criteria defining the best search results, such as statistical data on successful search result information related to particular search query elements.

In the exemplary embodiment illustrated in FIG. 5, the preferred optimized order of search query elements is defined to be when the first element has the least amount of database information related to it. In general, a search of the database 40 may be performed for multiple search query elements by individually performing a search for the first search query element. This first search yields a defined subset of database information. The search performed for the next search query element may be performed using the defined subset from the first search. In this manner, the database information related to the search query elements is the subset of database information found during the search using the last search query element.

If the first element is related to the least amount of database information, the overall searching process with multiple search query elements begins with the smallest possible subset of database information. One skilled in the art will quickly realize that the subsequent searches based on such a small subset of database information will be faster than if the subset of database information was initially large. Thus, it is advantageous to arrange the search query elements in an optimized order beginning with an entry (the first element) having the smallest amount of information in the database 40 corresponding to the entry. It is further contemplated that subsequent search query elements are arranged in an ascending fashion within the optimized order from the least amount of corresponding database information to the highest amount of corresponding database information.

In the previous example, the Amenity 100 element has the least amount of database information associated with it because the associated 50 records was less than 200 or 1500. The QLOB 1080 element (having 200 records) would be next followed by the LOB 2760 element (having 1500 records). One skilled in the art will recognize that by finding 50 records after searching using the first element, the subsequent searches using the second and third elements begin with a limited 50 record universe. Therefore, one skilled in the art will perceive the advantage of rearranging the elements into an optimized order of elements having an increasing number of relationships to records in the database.

After the search query elements are arranged into the optimized order, the search engine module 39 performs a search of the database 40 at step 530 using the optimized order of search query elements. Therefore, according to the above-described steps, the search query elements are rearranged into an optimized order in order to reduce the time the search engine module 39 takes to perform a search of the database 40.

Conclusion

From the foregoing description, it will be appreciated that an embodiment of the present invention provides a system and method for communication between an origination module and a destination module using the IR system's 26 MRA 38. An example of the origination module is one of the front end modules 33. An example of the destination module is the search engine module 39. After one of the origination modules receives a message, a specially formatted router packet is created from information within the message. The router packet is transmitted to the MRA 38 for routing to a destination module designated by the router packet. The MRA 38 then adaptively routes the router packet to the destination module.

If the destination module's queue is empty and the destination module is not currently processing any other packets, the MRA 38 places the router packet in the destination module's queue. The destination module reads the router packet from its queue 245 to process the router packet.

If there is another router packet being processed by the destination module, the MRA 38 stores the current router packet in the queue 245. Once processing of the other router packet is complete, the destination module can process the current router packet in the queue 245. If there is already another router packet pending within the destination module's queue 245, the MRA 38 can adapt by creating another destination module in memory.

If the current router packet is still not processed by the destination module within a predetermined amount of time, the MRA 38 sends an interrupt to cancel processing within the destination module and ensures that the current router packet is next to be processed.

If the router packet has been delivered to the search engine module 39, then the search query elements corresponding to the router packet's data components may be rearranged to an optimized order before a search is performed by the search engine module 39 using the search query elements.

The foregoing system may be conveniently implemented in one or more program modules having code that is based upon the flow diagrams in FIGS. 3, 4A, 4B, and 5. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of routing a specially formatted router packet from a front end module 33 to a search engine module 39 in an adaptive and dynamic manner using the MRA 38. However, those skilled in the art will understand that the principles of the present invention apply to any tasks or processes that must efficiently route information and messages within an information retrieval system.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for routing information between an origination module and a destination module using a routing achitecture within an information retrieval system, the method comprising the steps of:
   receiving the information;
   formatting the information into a router packet, by providing that a first part of the router packet includes data from the information;
   transmitting the router packet to the routine architecture; aid
   causing the router architecture to adaptively route the router packet to the destination module based upon a status of the destination module by
      (1) checking the status of the destination module by determining if another router packet is waiting to be processed by the destination module;
      (2) if another router packet is waiting to be processed, then creating an additional destination module as a created module that is a software module in a multithreaded software environment executing on a single processor of the information retrieval system; and
      (3) routing the router packet to the created module.

2. A method for routing information between an origination module and a destination module using a routing architecture within an information retrieval system, the method comprising the steps of:
   receiving the information;
   formatting the information into a router packet, by providing that a first part of the router packet includes data from the information;
   transmitting the router packet to the routing architecture; and
   causing the routing architecture to adaptively route the router packet to the destination module based upon a status of the destination module by
      (1) checking the status of destination module by determining if another router packet is waiting to be processed by the destination module;
      (2) if another router packet is waiting to be processed, then creating an additional destination module as a created module that is a software module dedicated to one of a plurality of processors within the information retrieval system; and
      (3) routing the router packet to the created module.

3. A method for routing information between an origination module ad a destination module using a routing architecture within an information retrieval system, the method comprising the steps of:
   receiving the information;
   formatting the information into a router packet, by providing that first part of the router packet includes data from the information;
   transmitting the router packet to the routing architecture; and
   causing the routing architecture to adaptively route the router packet to the destination module based upon a status of the destination module by causing the destination module to process the router packet, at the latest, after expiration of a threshold period by routing the router packet to a designated position within a queue associated with the destination module.

4. A method for routing information between an origination module and a destination module using a routing architecture within an information retrieval system, the method comprising the steps of;
   receiving the information;
   formatting the information into a router packet, by
      (i) provide that a first part the router packet includes data from the information;
      (ii) providing that a second part of the router packet includes a destination designation corresponding to the destination module;
      (iii) providing that a third part of the router packet includes an origination designation corresponding to the origination module receiving the information; and
      (iv) providing that a fourth part of the router packet includes an action designation corresponding to a desired action to be performed by the destination module on the data;
   transmitting the route packet to the routing architecture; and causing th routing architecture to adaptively route the router packet to the destination module based upon a status of the destination module.

5. A method for routing information between an origination module and a destination module using a routing architecture within an information retrieval system, the method comprising the steps of:
   receiving the information by the origination module, the information having a plurality of elements;
   creating a data packet using the elements within the information;
   formatting a router packet from the information, by
      (i) providing that a first part of the router packet includes a destination designation corresponding to the destination module,
      (ii) providing that a second part of the router packet includes an origination designation corresponding to the origination module receiving the information,
      (iii) providing that a third part of the router packet includes the data packet, and
      (iv) providing that a fourth part of the router packet includes an action designation corresponding to a desired action to be performed by the destination module using the elements from the information;
   after formatting, transmitting the router packet to the routing architecture;
   causing the routing architecture to determine the destination module; and
   causing the routing architecture to adaptively route the router packet to a queue corresponding to the destination module based upon a status of the destination module.

6. The method of claim 5, wherein the step of formatting the router packet further comprises:
   providing that a fifth part of the router packet includes a size designation corresponding to a size of the router packet; and
   providing that a sixth part of the router packet includes a packet sequence number referencing an association of the router packet to a group of router packets.

7. The method of claim 5, wherein the step of creating the data packet comprises arranging the elements into an initial order.

8. The method of claim 7, wherein the step of causing the routing architecture to adaptively route the router packet comprises:

checking the status of the destination module by determining if the destination module is a search engine; and if the destination module is the search engine, then arranging the initial order of the elements to an optimized order of the elements and routing the elements in the optimized order to the destination module.

9. The method of claim 8, wherein the step of arranging the initial order of the elements to the optimized order comprises:

(1) determining a number of records in a database that correspond to one of the elements;

(2) repeating the determining step for others of the elements; and (3) arranging the initial order of the elements into the optimized order of the elements based upon the number of records respectively corresponding to each element.

10. The method of claim 9, wherein step (3) comprises arranging the initial order into the optimized order wherein a first of the elements in the optimized order has a smallest number of records respectively corresponding to each element.

11. The method of claim 5, wherein the step of causing the routing architecture to adaptively route the router packet further comprises:

(1) determining if another router packet is in the queue;

(2) if another router packet is in the queue, then creating an new module in memory, the new module being a copy of the destination module; and (3) routing the router packet to the new module.

12. The method of claim 11, wherein step (2) further comprises providing the new module as a software module in a multithreaded software environment executing on a single processor of the information retrieval system.

13. The method of claim 11, wherein step (2) further comprises providing the new module as a software module dedicated to one of a plurality of processors within the information retrieval system.

14. The method of claim 5, wherein the step of causing the routing architecture to adaptively route the router packet further comprises:

(1) placing the router packet in a first position within the queue;

(2) if the router packet is not processed by the destination module within a threshold period, then sending an interrupt to the destination module; and (3) causing the destination module to process the router packet by changing the first position of the router packet within the queue.

15. The method of claim 14 further comprising the step, after step (2), of causing the destination module to cancel any processing activity being currently performed by the destination module.

16. The method of claim 15, wherein the changing step comprises placing the router packet in a second position within the queue, the second position designating the router packet to be the next to be processed by the destination module.

17. A method for routing information between an origination module and a destination module using a routing architecture within an information retrieval system, the method comprising the steps of:

receiving the information by the origination module, the information having a plurality of elements;

creating a data packet using the elements within the information;

formatting a router packet from the information, by
      (i) providing that a first part of the router packet includes a destination designation corresponding to the destination module,
      (ii) providing that a second part of the router packet includes an origination designation corresponding to the origination module receiving the information,
      (iii) providing that a third part of the router packet includes the data packet, and
      (iv) providing that a fourth part of the router packet includes an action designation corresponding to a desired action to be performed by the destination module using the elements from the information;

after formatting the router packet, transmitting the router packet to the routing architecture;

causing the routing architecture to determine the destination module;

causing the routing architecture to determine if another router packet is in a queue corresponding to the destination module;

placing the router packet in a first position within the queue;

if another router packet is in the queue, then creating an additional destination module in memory and routing the router packet to the additional destination module;

if the router packet is not processed by the destination module within a threshold period, then sending an interrupt to the destination module; and causing the destination module to process the router packet by changing the first position of the router packer within the queue.

18. The method of claim 17 further comprising, after the step of sending the interrupt, the step of causing the destination module to cancel its current processing activity.

19. The method of claim 17, wherein the step of creating the data packet comprises arranging the elements into an initial order.

20. The method of claim 19 further comprising the step of, if the destination module is the search engine, then arranging the initial order of the elements to an optimized order of the elements and routing the elements in the optimized order to the destination module.

21. The method of claim 20, wherein the arranging step comprises the steps of:

(1) determining a number of records in a database that correspond to one of the elements;

(2) repeating the determining step for each of the elements; and (3) arranging the initial order into the optimized order wherein a first of the elements in the optimized order has a smallest number of records respectively corresponding to each element.

* * * * *